UNITED STATES PATENT OFFICE.

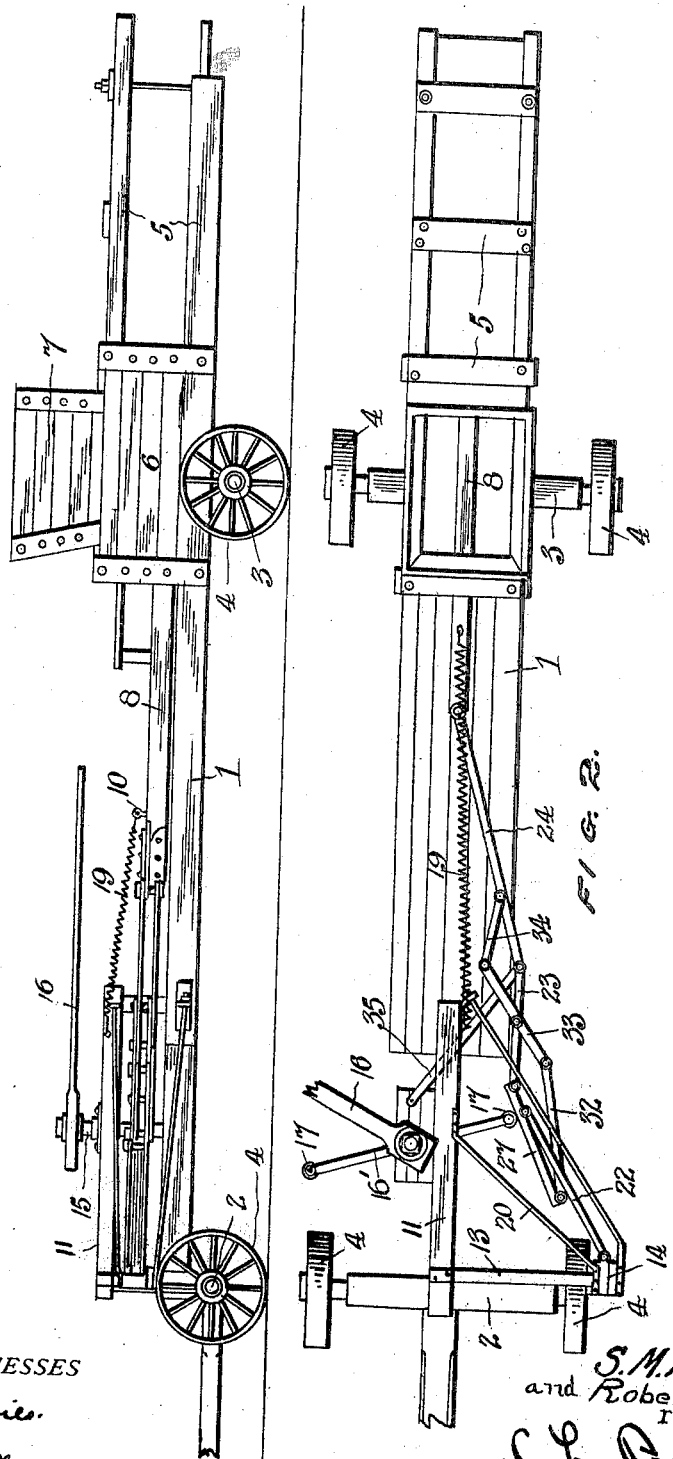

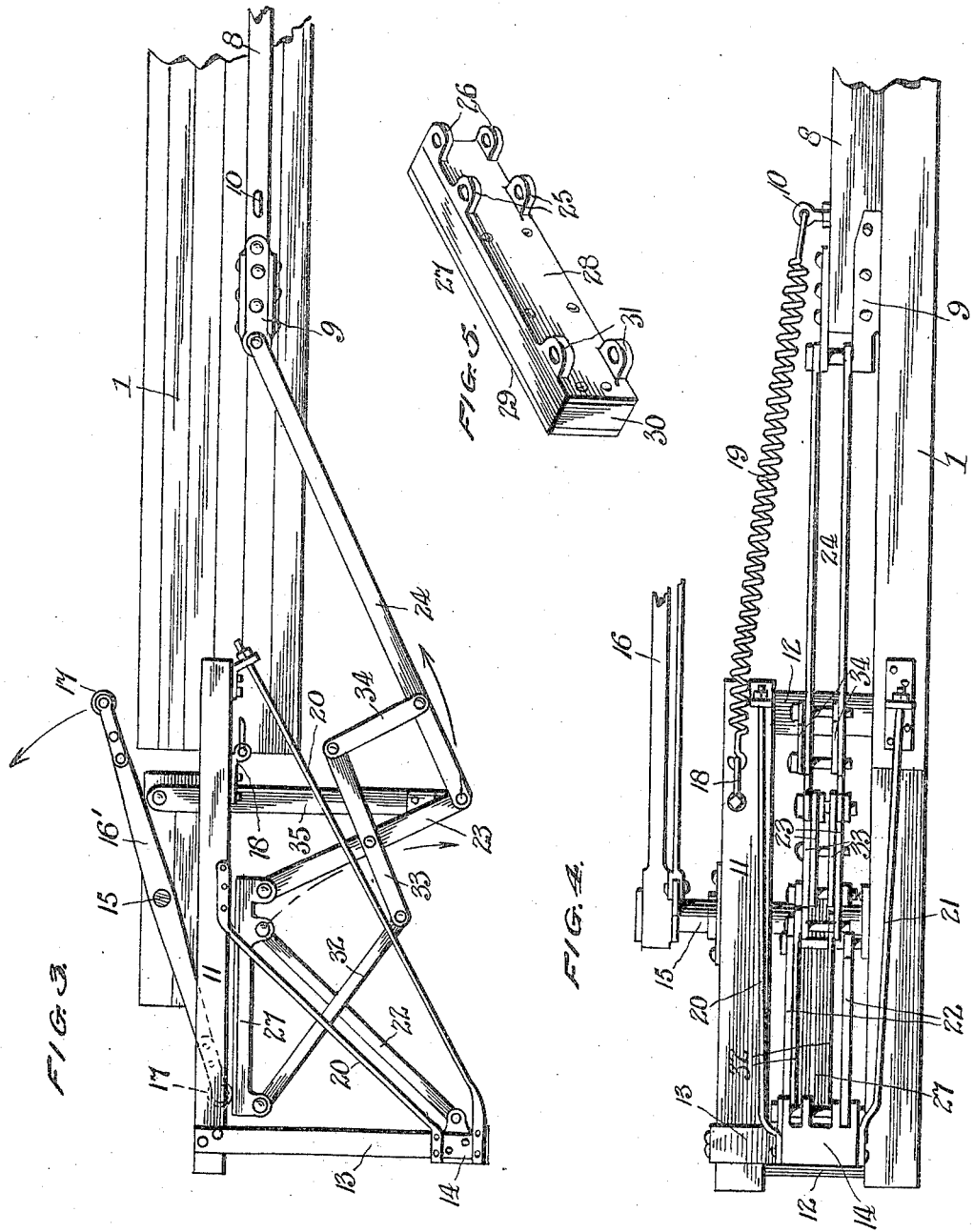

STEPHEN M. McCORKLE AND ROBERT L. PAYNE, OF FOSS, OKLAHOMA.

BALING-PRESS.

950,700.

Specification of Letters Patent. Patented Mar. 1, 1910.

Application filed May 19, 1909. Serial No. 497,093.

*To all whom it may concern:*

Be it known that we, STEPHEN M. Mc-CORKLE and ROBERT L. PAYNE, citizens of the United States, residing at Foss, in the county of Washita and State of Oklahoma, have invented certain new and useful Improvements in Baling-Presses, of which the following is a specification.

Our invention relates to baling presses, and more particularly to the operating mechanism thereof, and our object is to provide a more efficient construction and arrangement to produce an improved movement of the baling plunger better adapted to quick and efficient baling.

In the accompanying drawings, which illustrate our invention and form a part of this specification, Figure 1 is a side elevation of the complete machine. Fig. 2 is a plan view thereof. Fig. 3 is a plan view of the operating mechanism thereof, partly in section, with the retractile spring removed, and on an enlarged scale. Fig. 4 is a side elevation of our improved operating part as shown in Fig. 3, and, Fig. 5 is a perspective view of the contact shoe.

In the embodiment of our invention as shown, we provide a horizontal platform 1, which is supported at its forward and rear ends by forward and rear axles 2 and 3, provided with traction wheels 4.

Mounted upon the end of platform 1 is the skeleton baling chamber 5, having a forward closed portion 6 to which a material-receiving hopper 7, communicates. The baling plunger has its pitman 8 extending forwardly and centrally upon the platform 1, which pitman is provided at its forward extremity with a metallic yoke 9 and has an upwardly projecting eye bolt 10, rearwardly of said yoke.

Mounted upon the forward end of the platform 1, is a frame comprising a longitudinal beam 11 supported horizontally above said platform by uprights 12, at the forward end of which beam extends an angular arm 13, supporting at its outer extremity, a pivot block 14.

Mounted to one side of the frame beam 11, and vertically upon a portion of the platform 1, is an operating shaft 15, to the upper end of which is connected the inner end of the draft beam 16, the outer end of which is moved in a circular path by the attachment thereto of the drafting animals, and as is usual, intermediate its ends shaft 15 is provided with the usual operating arm 16', intermediately mounted and provided upon its ends with rollers 17, which ends and rollers upon the rotation of shaft 15, project beneath beam 11. Adjacent its rear end beam 11 is provided with a bracket 18 between which and the eye bolt 10, of the pitman 8, extends a retractile coil spring 19, tending to draw said pitman forwardly.

Extending between the upper and lower ends of pivot block 14, and the rear end of beam 11 and the platform 1, are brace rods 20 and 21 respectively.

Extending beyond the pivot block 14, and the yoke 9 at the forward end of pitman 8 is a toggle comprising arms 22, 23 and 24, the adjacent ends of arms 22 and 23 being pivotally connected between spaced pairs of ears 25 and 26 respectively at the rear end of a contact shoe 27, which shoe comprises, as shown in Fig. 5, a metallic base plate 28 and a surface contact plate 29 which may be suitably secured through a block 30 by a suitable shock absorbing material. The base plate 28 of shoe 27, which carries ears 25 and 26 is also provided with ears 31 at its forward ends, between which is pivotally secured one end of an arm 32, extending angularly and rearwardly across toggle arm 22, and forming one part of a lever mechanism which, upon the rotation of either end of the operating arm 16', against shoe 27, causes actuation of the toggle in opposite directions. The opposite end of arm 32 is pivotally connected to the forward end of a lever arm 33, crossing the toggle arm 23, and intermediately pivotally secured thereto, and is pivotally connected at its opposite end to the lever arm 34, extending between the same and the toggle arm 24, and pivotally secured intermediate the ends of the latter. A toggle supporting arm 35 is pivotally connected to the joining ends of the toggle arms 23 and 24, and is mounted to swing at its opposite end, upon a portion of the platfrom 1.

The operation of our toggle is as follows: The operating arm 16' when rotated engages initially the forward end of the shoe 27, thus causing the entire toggle to be swung rearwardly by virtue of the swinging member 35 pivoted to the frame 11 and the toggle. As the end 17 of the arm 16' travels rearwardly along the shoe 27, the said shoe 27 is forced further outwardly and the adjacent inner ends of the strips 22 and 23 are forced outwardly causing the toggle to collapse as is obvious from Fig. 2. Upon further rotation of the arm 16' the end 17 thereof rotates out of contact with said shoe 27, and the retractile spring 19 will return the toggle to the position shown in Fig. 3.

Having fully described our invention, we claim:

1. In a baling press of the character described, the combination of a supporting frame and a baling chamber, of a longitudinally reciprocatory plunger adapted to operate within said chamber, a toggle comprising a plurality of pivotally connected members, one of said members being pivotally connected to said plunger, a contacting shoe, one of said members of said toggle being pivotally connected to said shoe, a member pivotally connected to said shoe and to one of said members of said toggle, a member pivotally connected to said frame and said shoe, means for limiting the lateral movement of said toggle, and a rotary member adapted to actuate said shoe, substantially as described.

2. In a baling press of the character described, the combination with a supporting frame and a baling chamber, of a longitudinally reciprocatory plunger adapted to operate within said chamber, a toggle comprising a plurality of pivotally connected members, one of said members being pivotally connected to said plunger, a contacting shoe, one of said members of said toggle being pivotally connected to said shoe, a member pivotally connected to said shoe and to one of said members of said toggle, a member pivotally connected to said frame and said shoe, a member pivotally connected to said frame and said toggle, and a rotary member adapted to actuate said shoe, substantially as described.

3. In a baling press of the character described, the combination with a supporting frame and a baling chamber, of a longitudinally reciprocatory plunger adapted to operate within said chamber, a toggle comprising a plurality of pivotally connected members, one of said members being produced and having the end thereof pivotally connected to said plunger, a contacting shoe, one of said members of said toggle being produced and having its end pivotally connected to one end of said shoe, a member pivotally connected to the other end of said shoe and to the end of a produced member of said toggle, a member pivotally connected to said frame and said shoe near one end thereof, a member pivotally connected to said frame and said toggle adjacent the pivotally connected ends of two of said members of the same, and a rotary member adapted to actuate said shoe, substantially as described.

In testimony whereof we affix our signatures in presence of two witnesses.

STEPHEN M. McCORKLE.
ROBERT L. PAYNE.

Witnesses:
A. D. FREEMAN,
B. E. ANDERSON.